United States Patent
Wang

(10) Patent No.: US 11,673,221 B2
(45) Date of Patent: Jun. 13, 2023

(54) STRUCTURE OF WATER MILL

(71) Applicants: S.Y. PNEUMATIC INDUSTRIAL CO., Taichung (TW); WHIRLWIND TOOLS CO., LTD, New Taipei (TW)

(72) Inventor: Shih-Ming Wang, Taichung (TW)

(73) Assignee: S.Y. PNEUMATIC INDUSTRIAL CO., Taichung (TW)

( * ) Notice: Subject to any disclaimer, the term of this patent is extended or adjusted under 35 U.S.C. 154(b) by 998 days.

(21) Appl. No.: 16/517,260

(22) Filed: Jul. 19, 2019

(65) Prior Publication Data
US 2020/0061771 A1 Feb. 27, 2020

(30) Foreign Application Priority Data
Aug. 27, 2018 (TW) ................................. 107211682

(51) Int. Cl.
| | |
|---|---|
| B24B 7/18 | (2006.01) |
| B24B 55/02 | (2006.01) |
| B24B 23/02 | (2006.01) |
| B23C 1/20 | (2006.01) |

(52) U.S. Cl.
CPC ............ B24B 23/026 (2013.01); B24B 7/186 (2013.01); B24B 23/028 (2013.01); B24B 55/02 (2013.01); B23C 1/20 (2013.01)

(58) Field of Classification Search
CPC ........... B24B 7/18; B24B 7/186; B24B 23/00; B24B 23/026; B24B 23/028; B24B 55/02; B24B 55/045; B23C 1/20
USPC ................ 451/344, 353, 358, 359, 449, 450
See application file for complete search history.

(56) References Cited

U.S. PATENT DOCUMENTS

| | | | | |
|---|---|---|---|---|
| 4,102,084 A | * | 7/1978 | Bloomquist | B24B 23/03 451/295 |
| 5,445,558 A | * | 8/1995 | Hutchins | B24B 55/12 451/344 |
| 5,582,541 A | * | 12/1996 | Hutchins | B24B 23/03 451/344 |
| 5,597,348 A | * | 1/1997 | Hutchins | B24B 23/03 451/295 |
| 7,189,154 B1 | * | 3/2007 | Karppinen | B24B 23/03 451/449 |
| 2021/0276151 A1 | * | 9/2021 | Hayashi | B24D 9/085 |

FOREIGN PATENT DOCUMENTS

JP 2022033595 A * 3/2022

* cited by examiner

Primary Examiner — Eileen P Morgan
(74) Attorney, Agent, or Firm — Sinorica International Patent & Trademark

(57) ABSTRACT

An improved structure of water mill has a body provided with a handle part, a body part, a working head base and a pressing control switch. The handle part is provided with an intake passage, an exhaust passage, and a water inlet reversing passage. By triggering the pressing control switch, a high-pressure gas is guided into the intake passage and the body to drive the water grinder. A water pump gas outlet is provided with a double sleeve tube connected to a sealed water storage tank. The discharged high-pressure gas is guided into the sealed water storage tank through the outer tube of the double sleeve tube, so that the stored water is pressed back to the double sleeve tube and is simultaneously guided into the water inlet reversing passage. Finally, the water is guided out to the working head base, with simultaneous grinding and water cooling.

6 Claims, 6 Drawing Sheets

STRUCTURE OF WATER MILL

FIELD OF THE INVENTION

This invention relates to an improved structure of water mill and, more particularly, to structure for a pneumatic tool.

BACKGROUND OF THE INVENTION

The conventional water mill structure, as shown in FIG. 6, includes a water mill body 10, which is provided with a handle part 11 and a working head base 13. The handle part 11 is provided with a gas intake tube 110, and the working head base 13 is provided with a pneumatic rotor, which is combined with a water-grinding sheet 132. A water inlet control tube 133 is disposed on the rear side of the working head base 13. The water inlet control tube 133 is provided with a water inlet control switch 134, and is connected to an inlet pipe 135. A high-pressure gas is introduced through the gas intake tube 110 of the handle part 11, driving the pneumatic rotor inside the working head base 13 to rotate and starting the water inlet control switch 134 of the water inlet control tube 133. Water is thus guided in through the inlet pipe 135, and is supplied to the water-grinding sheet 132 combined to the end part of the pneumatic rotor of the working head base 13. However, since the water inlet control pipe 133 is provided in the rear side of the working head base 13 and has to be connected with the inlet pipe 135, the entire structure is thus large in size and inconvenient for the user to operate.

SUMMARY OF THE INVENTION

In view of the foregoing, this specification discloses an improved structure of water mill.

A primary objective of the invention is to provide an improved structure of water mill comprising a water mill body. The water mill body is provided with a handle part, a body part, a working head base and a pressing control switch. The handle part is provided with an intake passage, an exhaust passage and a water inlet reversing passage. The intake passage is provided with a gas inlet and an intake control knob. The exhaust passage is combined with an adjustable exhaust head. A water pump tube is arranged in the water inlet reversing passage. An intake control valve is disposed between the intake passage and the exhaust passage. A water pump gas outlet is provided in the exhaust passage, and is combined with a double sleeve tube. The double sleeve tube is provided with an inner tube and an outer tube. The inner tube is connected with one end of the water pump tube provided in the water inlet reversing passage. The other end of the water pump tube is connected to a water outlet tube. An inner cavity is formed in the body part and is provided with a pneumatic rotor. The pneumatic rotor is provided through with a shaft hole. The end surface of a connecting disk is connected with a water-grinding sheet. The intake passage and the exhaust passage of the handle part is in fluid communication with the inner cavity of the body part. An end of the pneumatic rotor in the inner cavity is connected with the connecting disk provided on the working head base in a driving way. The water outlet tube connected to the water pump pipe penetrates through the shaft hole of the pneumatic rotor to the water outlet hole of the connecting disk. By triggering the pressing control switch, a high-pressure gas is guided into the intake passage from the gas inlet. The intake control knob can be adjusted to adjust the intake amount. The high-pressure gas is guided into the inner cavity of the body part to drive the pneumatic rotor and, at the same time, the water-grinding sheet in the working head base. The discharged high-pressure gas is guided via the exhaust passage out to the adjustable exhaust head, and is guided by the water pump gas outlet into the outer tube of the double sleeve tube. The discharged high-pressure gas is guided into a sealed water storage tank through the outer tube. The stored water is thus guided into the inner tube of the double sleeve tube under the pressure. At the same time, the water is guided into the water pump tube to the water-grinding sheet through the water outlet tube. This enables simultaneous water discharge and cooling. The water discharge and cooling pipelines are effectively integrated inside the handle part, without unnecessary assembly and external pipelines. The invention thus reduces the structural size and is convenient in usage.

DESCRIPTION OF THE PREFERRED EMBODIMENTS

The aforementioned and other objectives and advantages of this disclosure will become clearer in light of the following detailed description of an illustrative embodiment of this invention described in connection with the drawings.

Figure 1:
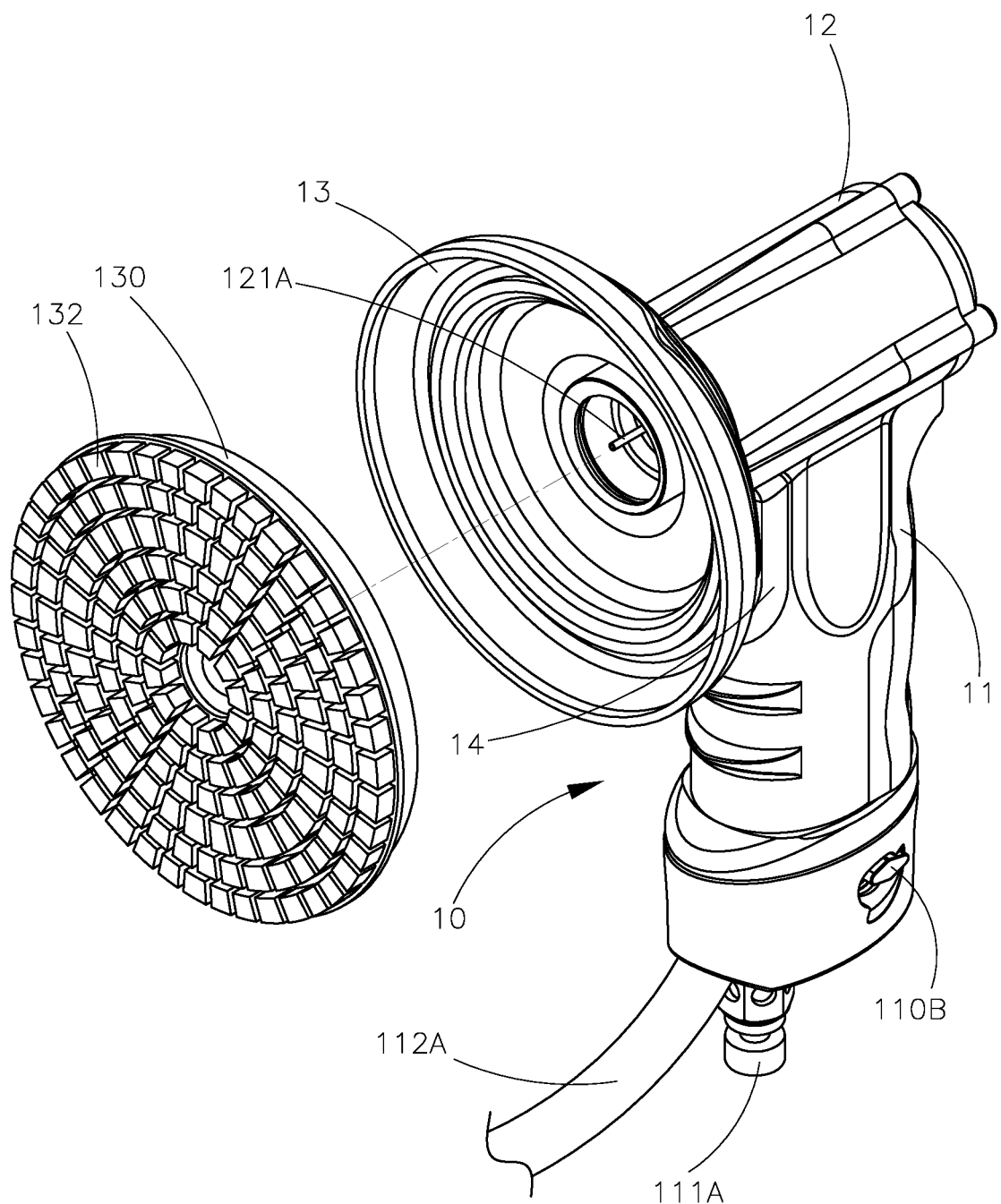
FIG. 1 is a schematic three-dimensional exploded view showing a part of the disclosed improved structure of water mill.
Figure 2:
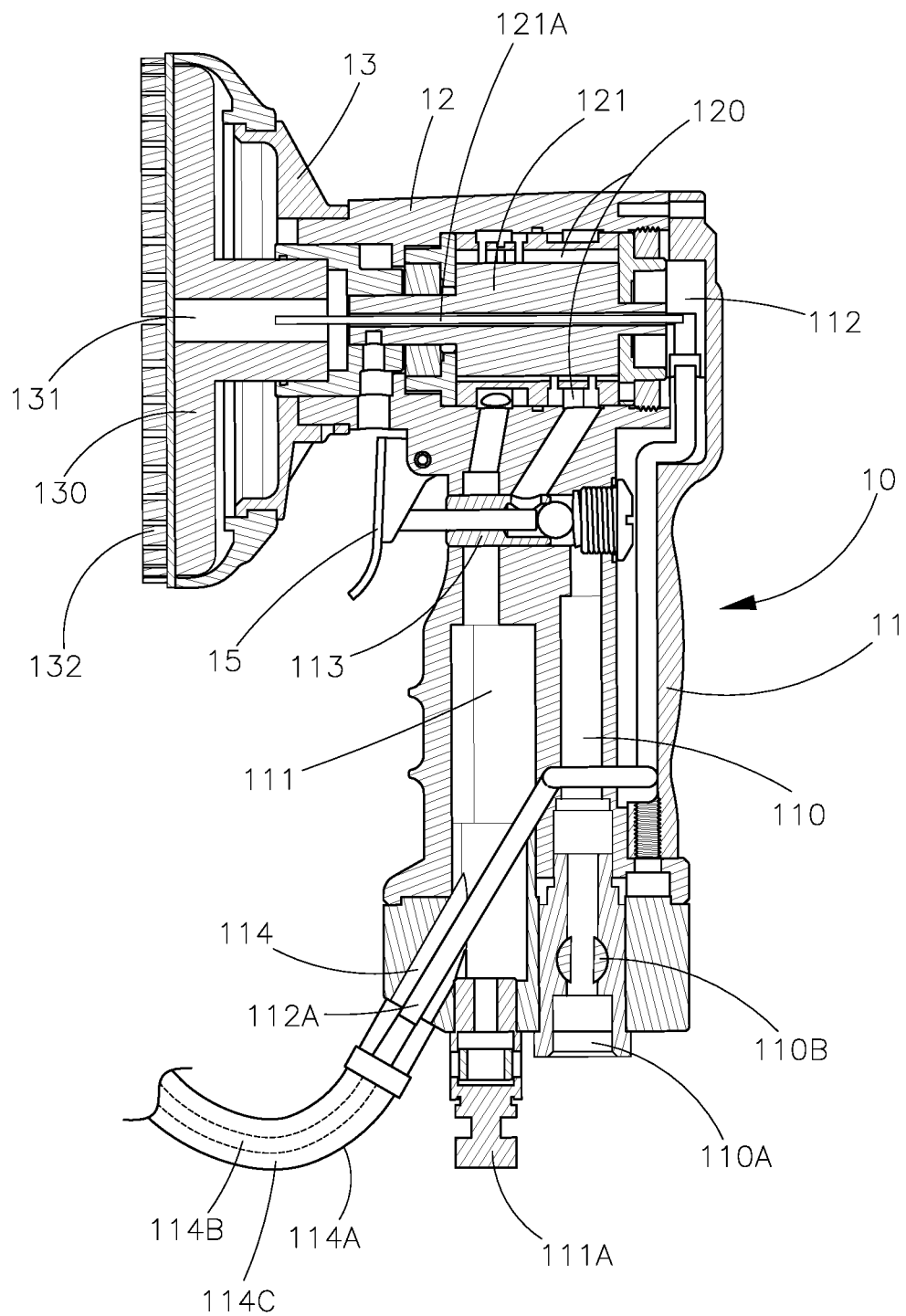
FIG. 2 is a schematic side cross-sectional view of the disclosed improved structure of water mill.
Figure 3:
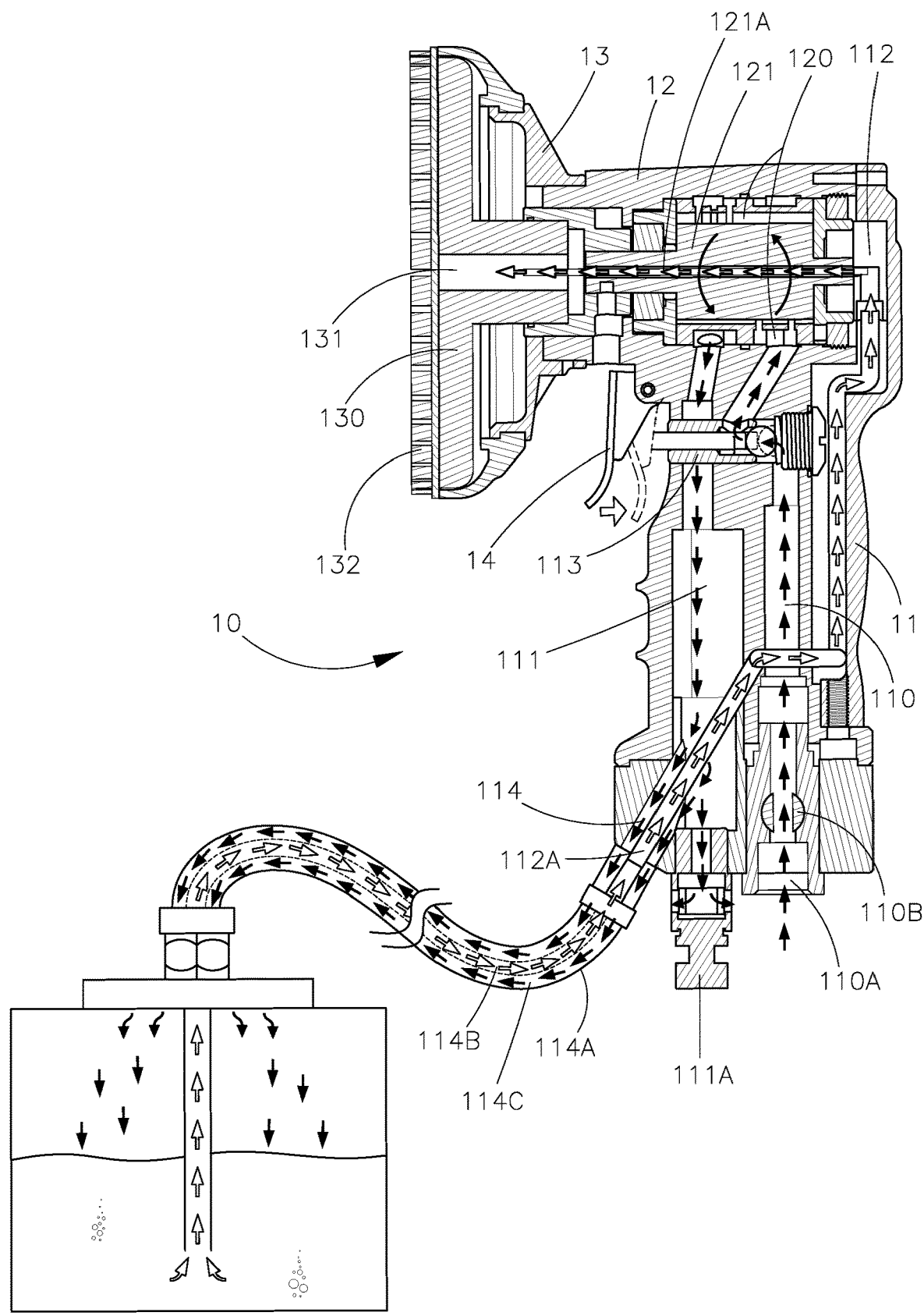
FIG. 3 is a schematic side cross-sectional view showing water guidance state of the disclosed improved structure of water mill.
Figure 4:
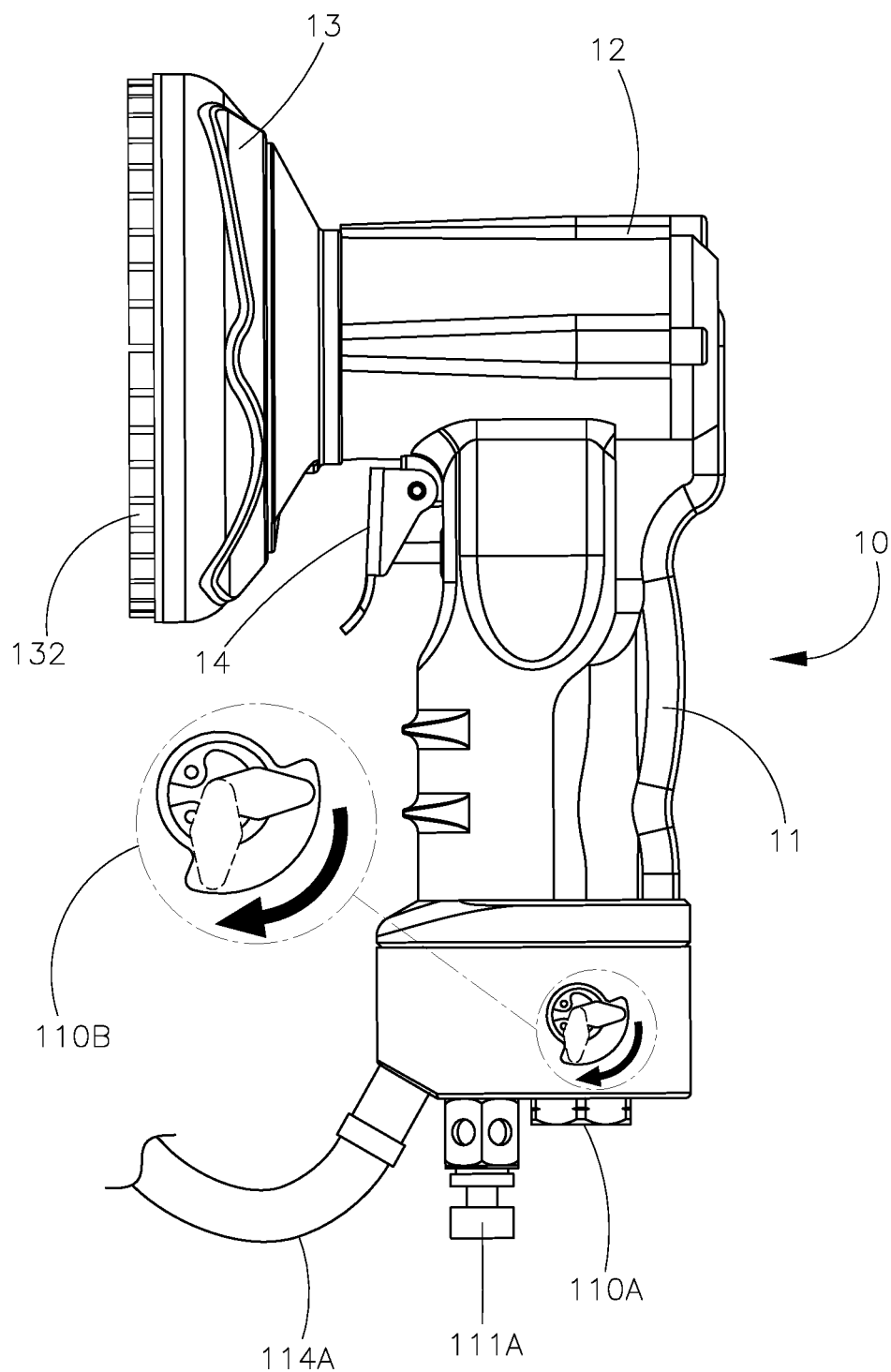
FIG. 4 is a schematic side view of the intake gas control knob provided in the intake passage of the handle part of the disclosed improved structure of water mill.
Figure 5:
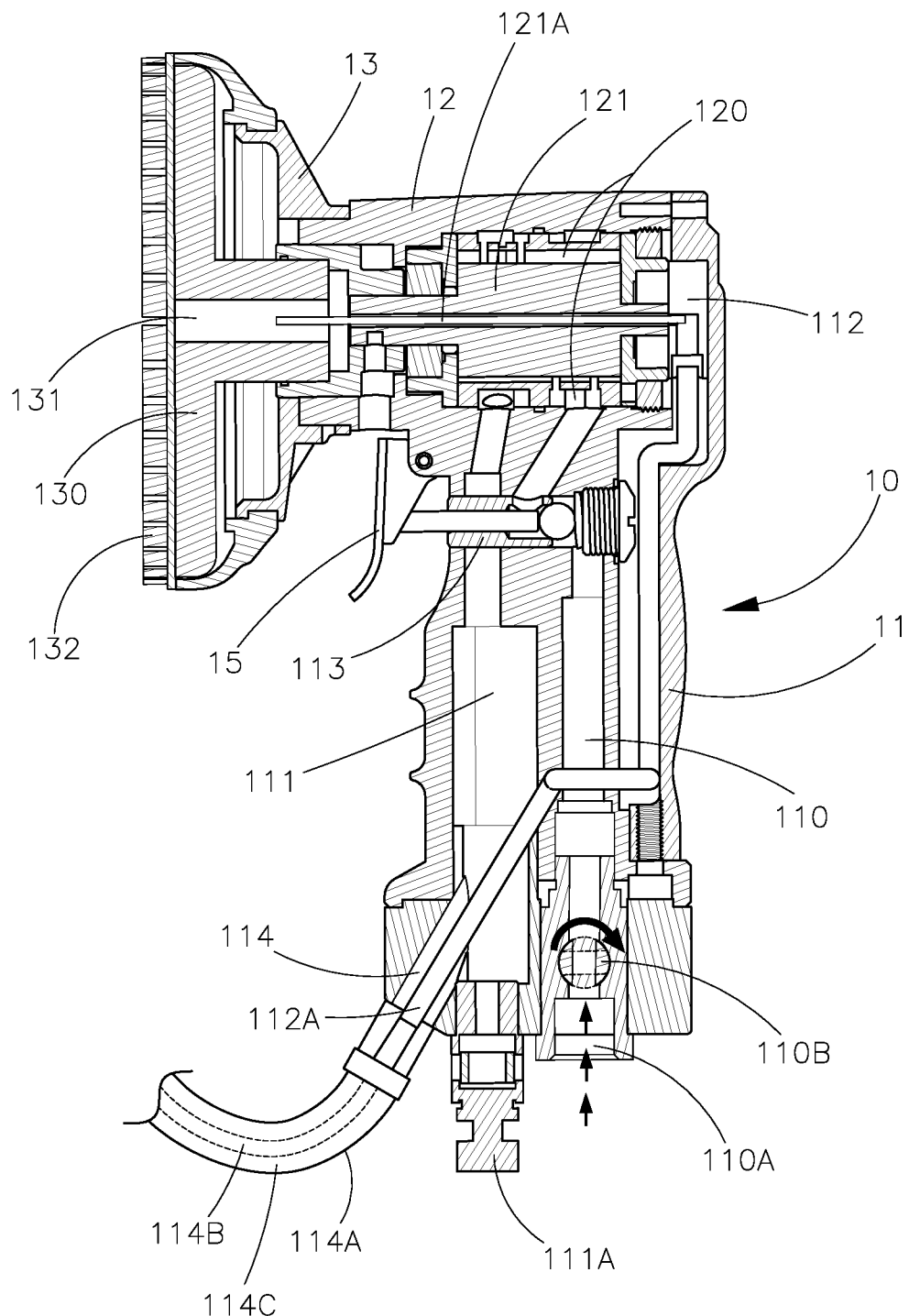
FIG. 5 is a schematic side view showing how gas is taken in by the intake gas control knob provided in the intake passage of the handle part of the disclosed improved structure of water mill.
Figure 6:
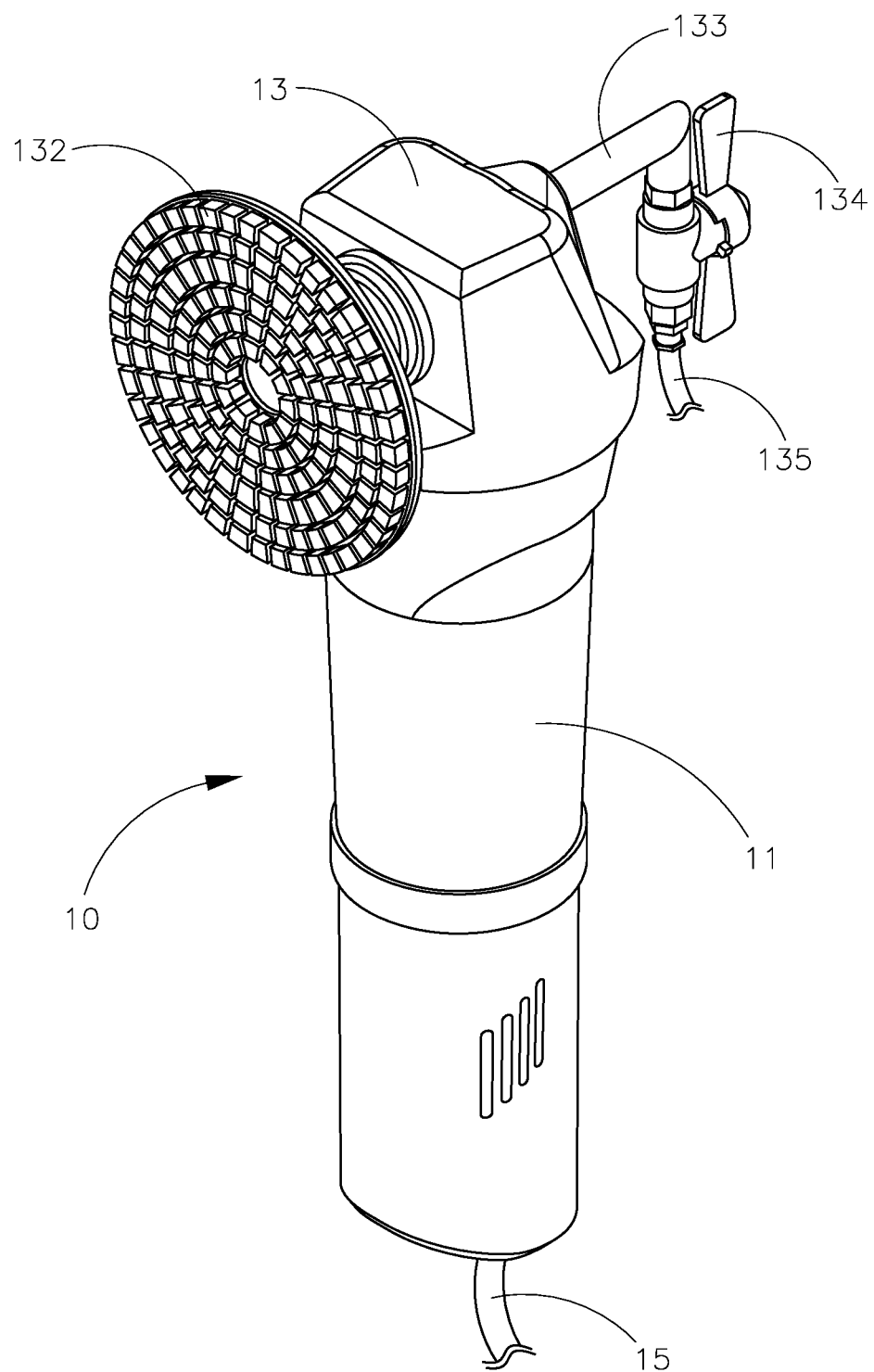
FIG. 6 is a schematic view of a conventional water mill structure.

Please refer to the FIGS. 1 and 2 for schematic three-dimensional locally exploded view and side cross-sectional view of the improved structure of water mill according to the invention. The improved structure includes: a water mill body 10, which is provided with a handle part 11, a body part 12, a working head base 13 and a pressing control switch 14. The handle part 11 includes an intake passage 110, an exhaust passage 111 and a water inlet reversing passage 112. The intake passage 110 is provided with a gas inlet 110A and an intake control knob 110B. The exhaust passage 111 is combined with an adjustable exhaust head 111A, which is an adjustable muffler. A water pump tube 112A is disposed in the water inlet reversing passage 112. An intake control valve 113 is disposed between the intake passage 110 and the exhaust passage 111. The exhaust passage 111 is provided with a water pump gas outlet 114, which is combined with a double sleeve tube 114A. The double sleeve tube 114A is provided with an inner tube 114B and an outer tube 114C. The inner tube 114B is connected to one end of the water pump tube 112A in the water inlet reversing passage 112. The other end of the water pump tube 112A is connected to a water outlet tube 112B. The body part 12 is formed with an inner cavity 120 that accommodates a pneumatic rotor 121. The pneumatic rotor is provided with a through shaft hole 121A. The working head base 13 is provided with a connecting disk 130, whose center is formed with a water outlet hole 131. One end surface of the connecting disk 130 is provided with a water-grinding sheet 132. The intake passage 110 and the exhaust passage 111 of the handle part 11 are in fluid communication with the inner cavity 120 of the body part 12. The end portion of the pneumatic rotor 121 in the inner cavity 120 is connected with the connecting disk 130 of the working head base 13 in a driving way. The water outlet tube 112B connected to the water pump tube 112A goes through the shaft hole 121A of the pneumatic rotor 121 and is guided to the water outlet hole 131 of the connecting disk 130.

The above-mentioned structure constitutes the improved structure of water mill according to the invention.

Please refer to FIGS. 2 to 5. The intake passage 110 and the exhaust passage 111 of the handle part 11 are in fluid communication with the inner cavity 120 of the body part 12. The end portion of the pneumatic rotor 121 in the inner cavity 120 is drivingly connected to the connecting disk 130 provided on the working head base 13. The water outlet tube 112B connected to the water pump tube 112A goes through the shaft hole 121A of the pneumatic rotor 121 and is guided to the water outlet hole 131 of the connecting disk 130. By triggering the pressing control switch 14, a high-pressure gas is guided into the intake passage 110 from the gas inlet 110A. The intake control knob 110B can be adjusted to adjust the intake amount. The high-pressure gas is guided into the inner cavity 120 of the body part 12 to drive the pneumatic rotor 121. At the same time, the connecting disk 130 of the working head base 13 is also driven. The discharged high-pressure gas is guided out to the adjustable exhaust head 111A via the exhaust passage 111, and is guided into the outer tube 114C of the double sleeve tube 114A via the water pump gas outlet 114. The discharged high-pressure gas is guided into the sealed water storage tank through the outer tube 114C. The stored water is pressurized to be guided into the inner tube 114B of the double sleeve tube 114A. At the same time, the water is guided into the water pump tube 112A and discharged to the water outlet hole 131 of the connecting disk 130 through the water outlet tube 112B. Besides, through the adjustable exhaust head 111A, one can adjust the pressure of the discharged high-pressure gas that is to be guided into the sealed water storage tank, thereby controlling the sizes of water pumping power and exhaust sound. Therefore, grinding is done simultaneously with water cooling. The invention effectively integrates the water cooling pipelines into the handle part 11. It avoids redundant assembly and external pipelines, thereby reducing the structural size and facilitating the convenience in usage.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

What is claimed is:

1. An improved structure of water mill, comprising a water mill body provided with a handle part, a body part, a working head base, and a pressing control switch; wherein the handle part is provided with an intake passage, an exhaust passage, and a water inlet reversing passage; the intake passage is provided with a gas inlet, and the exhaust passage is provided with an adjustable exhaust head; the water inlet reversing passage is provided with a water pump tube; an intake control valve is disposed between the intake passage and the exhaust passage; the exhaust passage is provided with a water pump gas outlet connected with a double sleeve tube; the double sleeve tube has an inner tube and an outer tube, with the inner tube connecting to one end of the water pump tube of the water inlet reversing passage; the other end of the water pump tube is connected with a water outlet tube; the body part is formed with an inner cavity that accommodates a pneumatic rotor; the working head base is provided with a connecting disk whose end surface is connected with a water-grinding sheet; the intake passage and the exhaust passage of the handle part is in fluid communication with the inner cavity of the body part; the end portion of the pneumatic rotor in the inner cavity is drivingly connected with the connecting disk of the working head base; and the water outlet tube of the water pump tube is guided to the connecting disk.

2. The improved structure of water mill of claim 1, wherein the intake passage is provided with an intake control knob to adjust the intake amount of the intake passage.

3. The improved structure of water mill of claim 1, wherein the pneumatic rotor is formed with a through shaft hole, and the water outlet tube connected to the water pump tube goes through the shaft hole to reach the water-grinding sheet.

4. The improved structure of water mill of claim 1, wherein the water pump gas outlet and the outer tube of the double sleeve tube are in fluid communication, and the other end of the double sleeve tube connects to a sealed water storage tank.

5. The improved structure of water mill of claim 1, wherein the adjustable exhaust head of the exhaust passage is an adjustable muffler.

6. The improved structure of water mill of claim 1, wherein the center of the connecting disk is formed with a water outlet hole.

* * * * *